(12) United States Patent
Famolari et al.

(10) Patent No.: US 6,611,510 B2
(45) Date of Patent: Aug. 26, 2003

(54) METHOD AND SYSTEM FOR SOFT HANDOFF OF MOBILE TERMINALS IN IP WIRELESS NETWORKS.

(75) Inventors: David Famolari, Montclair, NJ (US); David J. Marples, Mansfield Notts (GB)

(73) Assignee: Telcordia Technologies Inc., Morristown, NJ (US)

( * ) Notice: Subject to any disclaimer, the term of this patent is extended or adjusted under 35 U.S.C. 154(b) by 61 days.

(21) Appl. No.: 09/883,569

(22) Filed: Jun. 18, 2001

(65) Prior Publication Data

US 2002/0191567 A1 Dec. 19, 2002

(51) Int. Cl.⁷ .............................................. H04L 12/66
(52) U.S. Cl. ..................... 370/335; 370/352; 370/328
(58) Field of Search ................................ 370/335, 352, 370/312, 328, 331

(56) References Cited

U.S. PATENT DOCUMENTS

| | | | | |
|---|---|---|---|---|
| 5,267,261 A | * | 11/1993 | Blakeney et al. | ............ 370/332 |
| 5,835,723 A | * | 11/1998 | Andrews et al. | ............ 709/226 |
| 5,862,345 A | * | 1/1999 | Okanoue et al. | ............ 709/238 |
| 2001/0036834 A1 | * | 11/2001 | Das et al. | ............ 455/458 |
| 2002/0031107 A1 | * | 3/2002 | Li et al. | ............ 370/338 |
| 2002/0075824 A1 | * | 6/2002 | Willekes et al. | ............ 370/329 |
| 2002/0086691 A1 | * | 7/2002 | Kostic et al. | ............... 455/503 |
| 2002/0141360 A1 | * | 10/2002 | Baba et al. | ................. 370/331 |
| 2002/0142771 A1 | * | 10/2002 | Saifullah et al. | ............ 455/436 |

OTHER PUBLICATIONS

U.S. patent application Ser. No. 09/884,727, Famolari, filed Jun. 19, 2001, pending.

* cited by examiner

*Primary Examiner*—Steven Nguyen
*Assistant Examiner*—Michael J Molinari
(74) *Attorney, Agent, or Firm*—Joseph Giordano (57) ABSTRACT

A multicast address method for facilitating communication between nodes in "all IP" architectures that support CDMA soft handoff via IP multicasting wherein a multicast DHCP server allocates IP multicast addresses to mobile terminals from administratively scoped IP multicast addresses. IP multicast addresses are allocated to mobile terminals by offering, assigning, and distributing IP multicast addresses to the mobile terminals in response to IP multicast address requests from the mobile terminals to the multicast DHCP servers, which use unique mobile terminal identifiers to correlate mobile terminals with their prior and current IP multicast addresses. A multicast agent generates unicast IP address tables that map each of the unicast IP addresses, and edge routers use the unicast IP address tables to replace unicast IP addresses with their corresponding IP multicast address.

8 Claims, 6 Drawing Sheets

METHOD AND SYSTEM FOR SOFT HANDOFF OF MOBILE TERMINALS IN IP WIRELESS NETWORKS.

RELATED APPLICATION

This application is related to D. Famolari—D. I Marples U.S. application Ser. No 09/775,864, filed Feb. 2, 2002, and entitled "Method and System for Soft Handoff of Mobile Terminals in IP Wireless Networks".

FIELD OF THE INVENTION

The present invention generally relates to wireless Internet Protocol (IP) networks. More specifically, this invention relates to the soft handoff of mobile terminals in wireless Code Division Multiple Access (CDMA) IP networks.

BACKGROUND OF THE INVENTION

Modem wireless networks commonly employ CDMA techniques to communicate information between a mobile terminal and a base station. Modulating information using CDMA techniques provides an advantage over other modulation methods because CDMA techniques enable multiple base stations to simultaneously use the same channel space to communicate information. Thus, CDMA techniques permit channel overlap between base stations, which has a number of significant advantages in wireless communication systems, including the reduction of interference between mobile terminals and base stations, the exploitation of wireless network multipath components, and the simultaneous modulation and demodulation of information on multiple channels with multiple base stations.

Soft handoff is one method that uses these advantages to reduce error and increase the quality of service for wireless CDMA networks. Soft handoff is a steady-state condition wherein a mobile terminal simultaneously communicates identical information with a plurality of base stations. Soft handoff increases transmission and reception diversity at the mobile terminal, thereby increasing information capacity and quality of service while reducing the requisite signal to noise power ratio necessary to reliably communicate information. Soft handoff typically exists throughout a mobile terminal's network connection; nonetheless, the plurality of base stations that communicate with the mobile terminal may change as the mobile terminal physically changes location, thereby requiring the mobile terminal to switch the base stations with which it communicates.

In order to implement soft handoff within a wireless CDMA network, a mobile terminal and the plurality of base stations it communicates with must perform certain functions in order to maintain the plurality of mobile terminal-base station network connections. First, the mobile terminal must receive multiple redundant base station transmissions on the forward link from the plurality of base stations to the mobile terminal and combine these redundant transmissions to aggregate the information sent by the plurality of base stations. This aggregation reduces the information error rate and increases the quality of service for the mobile terminal. The base stations must use identical CDMA symbols to modulate information and synchronize their redundant transmissions to the mobile terminal on the forward link for the mobile terminal to accurately aggregate and demodulate the redundant transmissions received from the base stations.

In addition, the plurality of base stations receive multiple redundant mobile terminal transmissions on the reverse link from the mobile terminal to the plurality of base stations. A mobile switching center aggregates or selects appropriate transmissions from the multiple redundant transmissions received by the base stations in order to reduce the error rate and maintain a sufficient quality of service. Thus, the mobile terminal must also synchronously transmit information modulated with identical CDMA symbols to the plurality of base stations for the mobile switching center to aggregate or select the redundant transmissions received from the mobile terminal by way of the different base stations.

Modern wireless IP architectures use IP-based protocols to communicate messages in data packets between mobile terminals and base stations and specifically IP version 4 ("$IP_v4$") protocols. In these architectures, IP base stations are connected to a wireless IP backbone network through edge routers, which interface the IP base stations with the IP backbone network. Each IP base station performs dual functions as both an RF front end for base station-mobile terminal communications and as a real-time router for IP data packets communicated between the mobile terminals and the wireless IP backbone network. The wireless IP backbone network further includes an IP-based control plane to route messages to and from the IP base stations that communicate with the mobile terminals.

Variations of wireless IP architectures include architectures wherein each base station's coverage area defines an IP subnet. In these "all IP" architectures, each base station has its own IP subnet address, and each base station and mobile terminal requires layer 3 mobility management techniques to communicate messages between the base station and a mobile terminal as the mobile terminal crosses a cell boundary. Thus, a mobile terminal may require an IP subnet address change when it crosses from one cell site to another using Mobile IP, DHCP, DRCP, or other layer 3 mobility management techniques.

Supporting soft handoff of mobile terminals in "all IP" architectures is accomplished using IP multicasting to simultaneously communicate information between a mobile terminal and a plurality of base stations. IP multicasting is a method wherein a plurality of multicast group participants are part of a multicast group. Whenever a message is broadcast to the multicast group, the message is sent to every multicast group participant.

Soft handoff of a mobile terminal can be visualized as a layer 2 multicasting process, wherein identical information is transmitted to a mobile terminal from an IP network via a plurality of multicast participants that are members of the mobile terminal's multicast group. Each multicast participant is an IP network interface that resides at the mobile terminal. When the plurality of multicast participants are established at the mobile terminal, a corresponding number of multicast network connections are created between the IP network and the mobile terminal. The IP network and the mobile terminal simultaneously communicate identical information via these separate multicast network connections by sending and responding to messages multicast to the mobile terminal's multicast group. Thus, soft handoff of the mobile terminal is accomplished by establishing a multicast group corresponding to the mobile terminal, creating a plurality of multicast participants within the mobile terminal's multicast group located at the mobile terminal, and communicating information between the mobile terminal and the IP network as multicast messages to the mobile terminal's multicast group.

In the context of a wireless CDMA IP network, each multicast network connection corresponds to a communication channel between a mobile terminal and a base station.

When a plurality of multicast participants are created at a mobile terminal, each multicast participant corresponds to a multicast network connection between a base station and the mobile terminal. Each multicast network connection originates at one of the base stations and ends at the mobile terminal as a multicast IP network interface. Thus, a plurality of wireless CDMA IP network connections exist between the mobile terminal and the IP network through the plurality of multicast network connections between the base stations and the mobile terminal.

Once the plurality of multicast participants and multicast IP interfaces are established at the mobile terminal, information is communicated between the mobile terminal and the base stations by broadcasting the information to the mobile terminal's multicast group. The mobile terminal's multicast group is identified by the IP multicast address assigned to the mobile terminal that associates the mobile terminal with its multicast group and group participants. Multicast messages between the base stations and the mobile terminal are modulated and demodulated using CDMA techniques, thereby allowing the mobile terminal and its multicast network connections to share channel space with other mobile terminals and their multicast network connections while maintaining a soft handoff condition with the wireless CDMA IP network.

When providing soft handoff of mobile terminals using IP multicasting, the IP network must allocate IP multicast addresses to the mobile terminals in order to facilitate IP multicasting with the mobile terminals. Currently $IP_v4$ is the dominant Internet protocol used for Internet communications. $IP_v4$ uses a 32 bit addressing scheme. A number of issues arise when determining how to allocate IP multicast addresses to mobile terminals. One issue that arises is how to utilize IP address servers in order to allocate and distribute IP multicast addresses. Traditional wireless IP networks use Dynamic Host Configuration Protocol (DHCP) servers to allocate unicast IP addresses to mobile terminals in wireless IP networks. Unicast IP addresses are ordinary IP addresses that are used by the IP network to establish non-multicasting network connections between the IP network and a mobile terminal. These servers do not have the capability to offer, assign and distribute IP multicast addresses to mobile terminals, and thus ordinary DHCP servers cannot allocate IP multicast addresses to mobile terminals.

Another issue that arises when determining how to allocate IP multicast addresses to mobile terminals is determining what types of IP multicast addresses to allocate, and how to allocate them, particularly within the limitations of $IP_v4$. The Internet Assigned Number Authority (IANA) provides a total of $2^{28}$ IP addresses for use as IP multicast addresses, of which $2^{24}$ IP multicast addresses are provided for administratively scoped purposes. Administratively scoped IP multicast addresses are valid only within the domain of a particular administration, and thus identical administrative IP multicast addresses can be used simultaneously in different administrative domains without interference. In contrast, non-administratively scoped IP multicast addresses can only be used once regardless of the domain wherein the non-administrative IP multicast address is assigned and distributed.

SUMMARY OF THE INVENTION

These and other problems with the allocation of IP multicast addresses to mobile terminals when performing soft handoff of mobile terminals using IP multicasting are addressed by the present invention, which is a multicast address method for facilitating communication between nodes in "all IP" architectures that support soft handoff via IP multicasting and CDMA techniques. The present invention allocates administrative IP multicast addresses to mobile terminals within different administrative domains to promote efficient use of IP multicast addresses and maps unique mobile terminal identifiers to IP multicast addresses, thereby enabling the wireless IP network to track IP multicast address allocations to mobile terminals. The present invention also includes a multicast DHCP server that offers, assigns and distributes IP multicast addresses when allocating IP multicast addresses to mobile terminals. The present invention further includes a mobile terminal soft handoff protocol for allocating IP multicast addresses to mobile terminals and establishing soft handoff of the mobile terminals via IP multicasting.

The present invention allocates IP multicast addresses to mobile terminals from the $2^{24}$ (approximately 16.7 million) administratively scoped IP multicast addresses that can be allocated irrespective of other administrative domains. The same administrative IP multicast address can be simultaneously allocated to different mobile terminals that reside in different administrative domains because administrative IP multicast addresses are only valid within their particular administrative domain. If a plurality of mobile terminals that reside in different administrative domains are allocated an identical administrative IP multicast address, each administrative IP multicast address is valid only within the particular administrative domain wherein each mobile terminal resides. Thus, each of the plurality of mobile terminals may use an identical administrative IP multicast address without interfering with the other mobile terminals that reside in different administrative domains. Allocation of administrative IP multicast addresses to mobile terminals thereby promotes efficient use of the available IP multicast address space by enabling simultaneous allocation of identical IP multicast addresses to different mobile terminals within different administrative domains.

Each administrative domain includes a domain administrator that has the ability to allocate administrative IP multicast addresses to mobile terminals within its administrative domain. Whenever a domain administrator allocates an IP multicast address to a mobile terminal, the IP multicast address is an administrative IP multicast address from the administrative IP multicast address pool for that administrative domain. Thus, whenever a mobile terminal requests an IP multicast address from the IP network, the domain administrator serving the mobile terminal allocates an administrative IP multicast address from its administrative IP multicast address pool irrespective of other administrative domains. The mobile terminal receives the administrative IP multicast address from the domain administrator as its IP multicast address for its multicast address group.

The domain administrator allocates an IP multicast address to a mobile terminal by mapping a unique mobile terminal identifier from the mobile terminal to the administrative IP multicast address allocated to the mobile terminal. A mobile terminal identifier is any unique identification feature that distinguishes a mobile terminal from other mobile terminals and may include, e.g., the mobile terminal's International Mobile Subscriber Identity (IMSI), Mobile Serial Number (MSN), or any other unique mobile terminal feature. By mapping a mobile terminal to its IP multicast address using a mobile terminal identifier, the wireless IP network is able to determine a mobile terminal's IP multicast address and communicate information to the mobile terminal by broadcasting the information as a multicast message to the mobile terminal's IP multicast address.

When a mobile terminal traverses from one administrative domain to another, it broadcasts a system ID in the other administrative domain, using standard physical layer CDMA pilot techniques. When this occurs, the new administrative domain goes through the standard procedures, and the mobile terminal releases its administrative IP multicast address from its former administrative domain and receives a new multicast address that is valid in its new administrative domain. However, where the administrative domains are operated by different communication companies, there may be agreements between the two companies allowing for a mobile terminal to retain both its new and its old multicast addresses in a limited area of overlap of the two administrative domains.

In order to allocate IP multicast addresses, the present invention includes multicast DHCP servers to allocate IP multicast addresses to mobile terminals. Multicast DHCP servers perform the unicast IP address allocation functions of traditional DHCP servers, but also include functions to offer, assign and distribute IP multicast addresses to mobile terminals. When a mobile terminal contacts a multicast DHCP server with a request for an IP multicast address, the multicast DHCP server responds to the IP multicast address request by offering, assigning and distributing an IP multicast address to the mobile terminal. The multicast DHCP server also records the mobile terminal identifier and IP multicast address of the mobile terminal to track the current use of IP multicast addresses, and for future use when allocating IP multicast addresses to the mobile terminal and other mobile terminals.

When allocating IP multicast addresses to a mobile terminal, the multicast DHCP server attempts to offer, assign and distribute an IP multicast address to the mobile terminal that has been allocated to the mobile terminal in a prior allocation by the multicast DHCP server. The multicast DHCP server allocates prior IP multicast addresses to the mobile terminal by mapping the mobile terminal's unique mobile terminal identifier to IP multicast addresses that the multicast DHCP server has allocated to the mobile terminal in previous IP multicast address allocations. The multicast server uses both the IP multicast address and the mobile terminal ID to check for possible IP multicast addresses that the multicast DHCP server has allocated to the mobile terminal previously. Where the administrative domain is a very large geographic area, the process may be more efficiently handled by using multiple DHCP servers within a single domain.

As noted above, by cross referencing on a multicast or a mobile terminal ID, a multicast server can allow a mobile terminal to add a new multicast address while retaining its old multicast address, using data base management techniques.

By allocating a prior IP multicast address to a mobile terminal, the IP network reduces data caching at the mobile terminal and increases the probability that the IP network can locate the mobile terminal using its IP multicast address.

When a mobile terminal has received an IP multicast address from a multicast DHCP server, the mobile terminal simultaneously communicates with a plurality of IP network nodes once a plurality of multicast network connections have been established and soft handoff has occurred. Within "all IP" wireless network architectures, each base station includes its own IP subnet address and acts as a separate IP network node. Thus, when a mobile terminal simultaneously communicates with a plurality of IP base stations via IP multicasting in "all IP" wireless network architectures, the mobile terminal simultaneously communicates with a plurality of IP network nodes while in soft handoff.

In order to establish soft handoff with a plurality of IP network nodes, the mobile terminal must establish a plurality of multicast network connections between itself and the IP base stations. These multicast network connections are established by means that include a mobile terminal multicasting soft handoff process wherein a mobile terminal acquires an IP multicast address and enters into soft handoff with the IP network.

Upon power up and registration with the IP network, the mobile terminal initially secures a plurality of unicast IP addresses from the IP network nodes. Each node allocates one unicast IP address to the mobile terminal which is associated with a particular network interface, and thus the number of unicast IP addresses secured by the mobile terminal corresponds to the number of IP network nodes that the mobile terminal will communicate with during soft handoff. For a wireless CDMA IP network, each unicast IP address corresponds to a network interface on that terminal and to a base station's CDMA pilot signal.

The mobile terminal then acquires an IP multicast address from a multicast DHCP server within the mobile terminal's administrative domain. The multicast DHCP server records the allocation of the IP multicast address to the mobile terminal using its unique mobile terminal identifier, thereby avoiding allocation of duplicate IP multicast addresses to different mobile terminals within the mobile terminal's administrative domain. The mobile terminal registers its unicast IP addresses with a multicast agent by transmitting its unicast IP addresses, mobile terminal identifier and IP multicast address to the multicast agent, thereby creating a plurality of multicast network connections. The multicast agent generates a table of unicast IP addresses and their corresponding mobile terminal identifier and IP multicast address, and forwards this unicast IP address table to the IP network edge routers. The IP network edge routers are configured to substitute a mobile terminal's IP multicast address for any corresponding unicast address when communicating information between the wireless IP network and the mobile terminal. Thus, when information is communicated using a mobile terminal's unicast IP address, the edge routers replace the unicast IP address with the mobile terminal's IP multicast address, thereby multicasting the original unicast information to the mobile terminal. When the mobile terminal ends its IP network connection, it notifies the multicast DHCP server and releases its IP Multicast address, thereby releasing its IP multicast address and enabling the multicast DHCP server to allocate the IP multicast address previously allocated to the mobile terminal to another mobile terminal in response to an IP multicast address request.

Thus, in accordance with an aspect of our invention, a multicast agent registers IP network connections for the mobile terminals as multicast connections. Further, in addition to the DHCP server already employed, a second multicast DHCP server within an administrative domain allocates multicast addresses to the mobile terminals.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
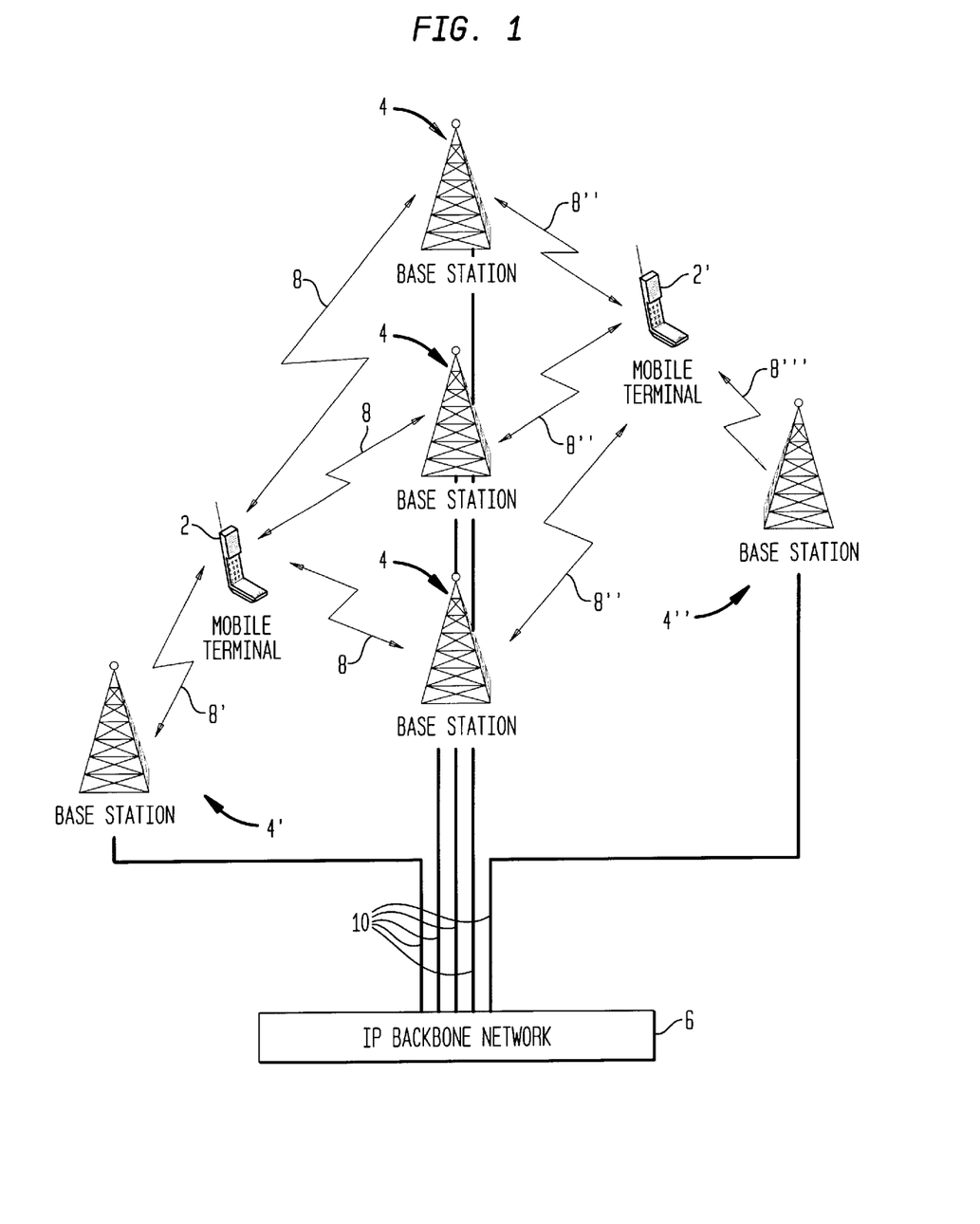
FIG. 1 is a generalized diagram of a CDMA IP multicasting soft handoff system.

Referring now to FIG. 1, therein is shown a diagram of a CDMA IP multicasting soft handoff system utilizing multicasting in accordance with our invention. A plurality of mobile terminals 2 and 2' are in a steady-state soft handoff condition with a plurality of base stations 4, 4' and 4" via their multicast network connections 8, 8', 8" and 8'". The base stations 4, 4' and 4" are connected to the wireless IP backbone network 6 via wireless IP backbone network connections 10. In an "all IP" architecture, the base stations 4, 4' and 4" have their own IP subnet address, and thus the mobile terminals 2 and 2' are in soft handoff with a plurality of IP network nodes 4, 4' and 4".

Each mobile terminal 2 and 2' is in soft handoff via multicast network connections with certain base stations. The three base stations 4 communicate with mobile terminal 2 via the three separate multicast network connections 8 between the base stations 4 and mobile terminal 2. The three base stations 4 also communicate with mobile terminal 2' via the three separate multicast network connections 8" between the base stations 4 and mobile terminal 2'. In addition, base station 4' communicates with mobile terminal 2 via the multicast network connection 8', and base station 4" communicates with mobile terminal 2' via the multicast network connection 8'". Thus, mobile terminal 2 is in soft handoff with the four base stations 4 and 4' via its four multicast network connections 8 and 8'. Similarly, mobile terminal 2' is in soft handoff with the four base stations 4 and 4" via its four multicast network connections 8" and 8'". Communications between the mobile terminals 2 and 2' and the wireless IP backbone network 6 take place via wireless IP backbone network connections 10 between the wireless IP backbone network 6 and the base stations 4, 4' and 4".

Whenever the wireless IP backbone network 6 sends information to the mobile terminals 2 and 2', the wireless IP backbone network 6 broadcasts the information as a multicast message to the multicast groups associated with the mobile terminals 2 and 2', respectively. For instance, when the wireless IP backbone network 6 sends information to mobile terminal 2, it broadcasts a multicast message to the multicast group of mobile terminal 2 as specified by its IP multicast address. Similarly, when the mobile terminal 2 sends information to the wireless IP backbone network 6, the mobile terminal 2 responds to the sender of the multicast message which is the wireless IP backbone network 6. Thus, information communicated between the wireless IP backbone network 6 and the mobile terminal 2 is communicated through the four multicast IP network connections 8 and 8'.

Figure 2:
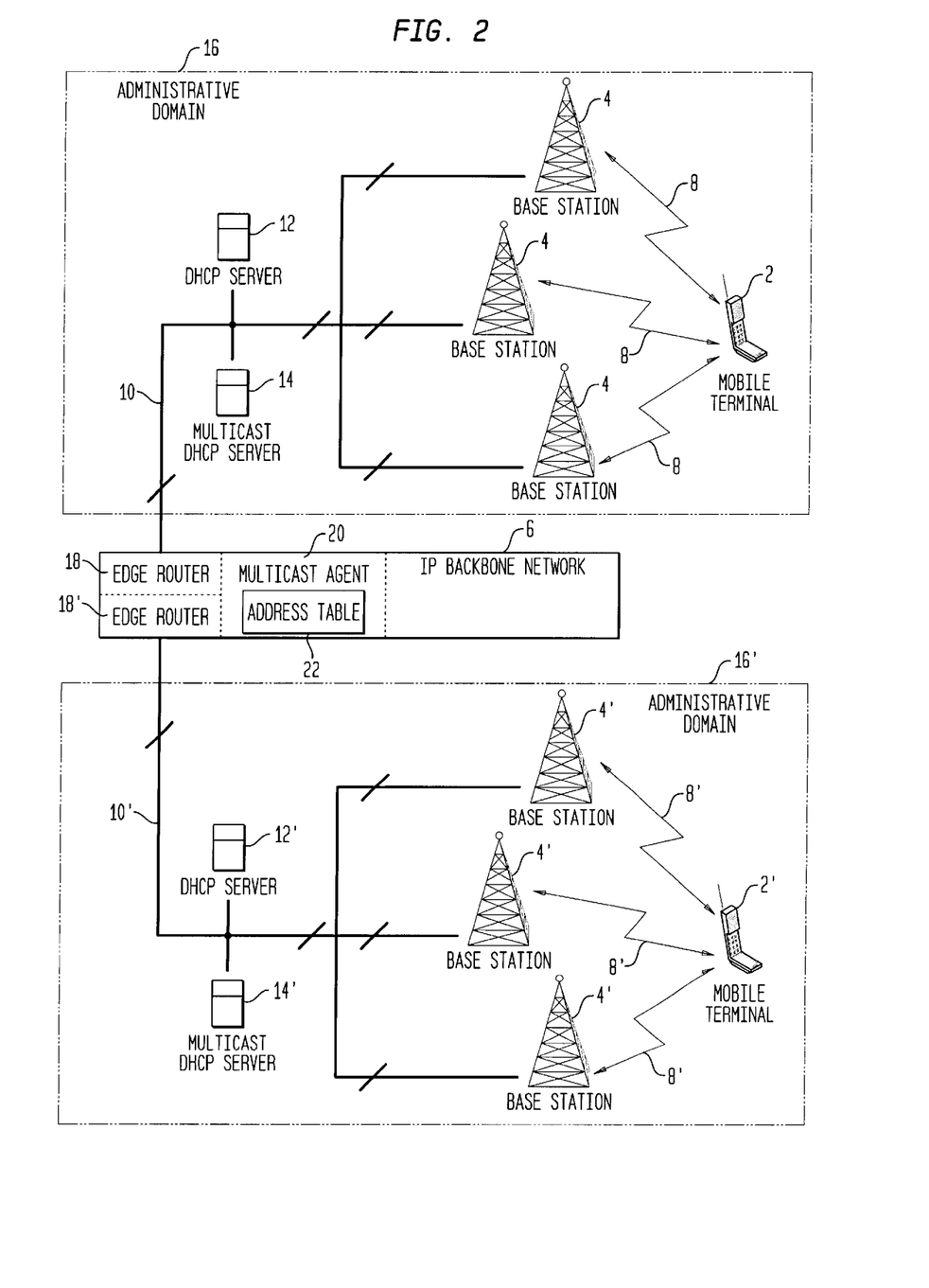
FIG. 2 is a block diagram of one illustrative specific embodiment of CDMA IP multicasting address administration system in accordance with our invention.

Referring now to FIG. 2, therein is shown a diagram of a CDMA IP multicasting address administration system in accordance with our invention. Two separate administrative domains 16 and 16' are shown, and two mobile terminals 2 and 2' are engaged in soft handoff within these two administrative domains 16 and 16', respectively. The IP backbone network 6 communicates with the first administrative domain 16 via the IP backbone network connections 10 and edge router 18, and the IP backbone network 6 communicates with the second administrative domain 16' via the IP backbone network connections 10' and edge router 18'. The three base stations 4 are members of the first administrative domain 16, and the three base stations 4' are members of the second administrative domain 16'.

The DHCP server 12 and multicast DHCP server 14 serve the three base stations 4 within the first administrative domain 16, and the DHCP server 12' and multicast DHCP server 14' serve the three base stations 4' within the second administrative domain 16'. It should be understood that a single DHCP server may in fact serve a plurality of administrative domains, and thus a single DHCP server may include the functions of the DHCP servers 12 and 12' within the administrative domains 16 and 16', respectively. Similarly, it should be understood that a single multicast DHCP server may in fact serve a plurality of administrative domains, and thus a single multicast DHCP server may include the functions of the multicast DHCP servers 14 and 14' within the administrative domains 16 and 16', respectively. The multicast agent 20 in the backbone network 6 serves both administrative domains 16 and 16'.

The mobile terminals 2 and 2' establish soft handoff by requesting an IP multicast address from the multicast DHCP servers 14 and 14', respectively, that serve their administrative domains 16 and 16'. For instance, when mobile terminal 2 powers up, it initially receives non-multicasting IP internet addresses from the DHCP server 12 for its three base station IP network connections 8. The mobile terminal 2 then sends an IP multicast address request to the domain administrator that serves its administrative domain 16, which is the multicast DHCP server 14. The multicast DHCP server 14 allocates an administrative IP multicast address to the mobile terminal 2, which then registers its non-multicasting IP network connections 8 as multicast network connections with the multicast agent 20. The multicast agent 20 registers the IP network connections 8 as multicast network connections and generates a unicast IP address table 22 used to configure the edge router 18. The IP address table 22 associates a unique identifier for the mobile terminal with an IP multicast address. The multicast agent 20 then forwards the unicast IP address table 22 to the edge router 18, which is configured to communicate any further information between the mobile terminal 2 and IP backbone network 6 as multicast messages broadcast over the multicast network connections 8 between the base stations 4 and the mobile terminal 2. Thus, soft handoff of the mobile terminal 2 is established.

Mobile terminal 2' proceeds through the same process to establish soft handoff, except that it is within the second administrative domain 16' and thus is served by the DHCP server 12' and multicast DHCP server 14' when receiving unicast IP network connections 8' and an IP multicast address, respectively. The administrative IP multicast address allocated to the mobile terminal 2' may be the same as the administrative IP multicast address allocated to mobile terminal 2 because they reside in different administrative domains, with mobile terminals 2 and 2' in administrative domains 16 and 16', respectively. Upon registration with the multicast agent 20, the mobile terminal 2' also communicates information through its multicast network connections 8' between the base stations 4' and the mobile terminal 2', and the edge router 18' communicates information between the IP backbone network 6 and the mobile terminal 2' as multicast messages broadcast over the multicast network connections 8'. Thus, soft handoff of the mobile terminal 2' is established.

Alternatively, mobile terminals 2 and 2' can be thought of as the same mobile terminal that initiated its wireless IP network connection in the first administrative domain 16, and then subsequently migrated to the second administrative domain 16'. When the mobile terminal 2 is within the first administrative domain 16, it secures an administrative IP multicast address from the multicast DHCP server 14 located within the first administrative domain 16 and enters into soft handoff with the plurality of base stations 4 within the first administrative domain 16. When the mobile terminal 2 traverses from the first administrative domain 16 into the second administrative domain 16', it becomes the mobile terminal 2' and resides within the second administrative domain 16'.

An administrative IP multicast address is only valid within the administrative domain wherein it is issued, and thus the initial IP multicast address issued to the mobile terminal 2' by the multicast DHCP server 14 for the first administrative domain 16 is not valid. Thus, as the mobile terminal 2 traverses from the first administrative domain 16 to the second administrative domain 16' to become mobile terminal 2', the mobile terminal must release its IP multicast address received from the multicast DHCP server 14 within the first administrative domain 16, and request a new IP multicast address from the multicast DHCP server 14' within the second administrative domain 16'. The determination that a mobile terminal 2 has traversed from one to another of the administrative domains utilizes physical layer CDMA pilot signals, as is known in the art. While a mobile terminal may have physical connections in two domains, as it traverses from one to another if there is an overlap of the domains, it will never have two addresses at the IP level from both domains. Application continuity in such a case will be handled by the multicast agents of the two domains, which will exchange information to keep the routings current, in accordance with prior agreements or arrangements between the two domains.

Figure 3:
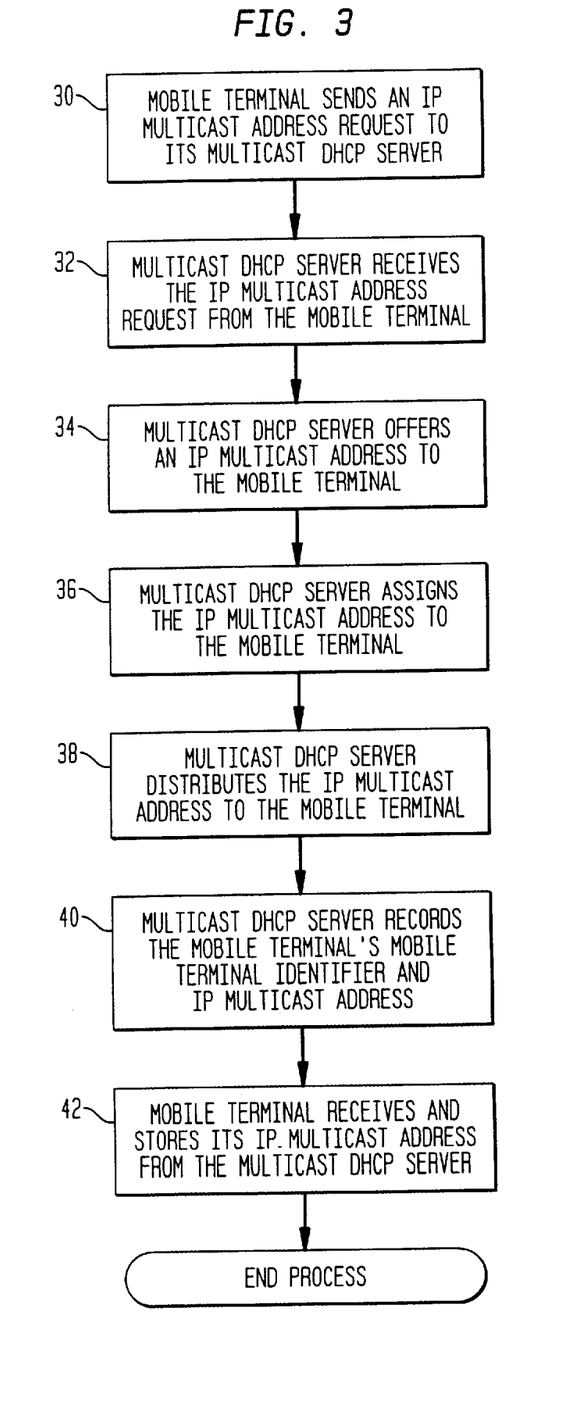
FIG. 3 is a flowchart of an IP multicast address allocation process for our invention.

FIG. 3 shows the IP multicast address allocation process wherein a multicast DHCP server receives an IP multicast address request from a mobile terminal and allocates an IP multicast address to the mobile terminal. The IP multicast address allocation process includes steps wherein a domain administrator offers, assigns and distributes an IP multicast address to a mobile terminal. Within a wireless CDMA IP network, the domain administrator includes a multicast DHCP server that allocates IP multicast addresses to mobile terminals.

Referring now to FIG. 3, the mobile terminal first transmits an IP multicast address request to the wireless IP backbone network, which is forwarded to the domain administrator that serves the mobile terminal's administrative domain (step 30). The domain administrator receives the IP multicast address request from the mobile terminal, which includes a unique mobile terminal identifier for the mobile terminal (step 32). The domain administrator processes the IP multicast address request and offers an administrative IP multicast address to the mobile terminal (step 34). The domain administrator then assigns the offered administrative IP multicast address to the mobile terminal in accord with the IETF document RFC 1531, the internet standard, (step 36), and distributes the assigned administrative IP multicast address to the mobile terminal by transmitting the administrative IP multicast address to the mobile terminal (step 38).

The domain administrator records the mobile terminal's unique mobile terminal identifier and allocated administrative IP multicast address to track the use of the IP multicast address (step 40). Recording the allocation of administrative IP multicast addresses allows the domain administrator to determine administrative IP multicast address availability when allocating administrative IP multicast addresses, as well as providing a record of prior administrative IP multicast address allocation to mobile terminals when offering administrative IP multicast addresses to a mobile terminal. The mobile terminal receives its administrative IP multicast address assigned by the domain administrator and stores its administrative IP multicast address, thereby enabling the mobile terminal to establish multicast network connections with the wireless IP network (step 42).

Figure 4:
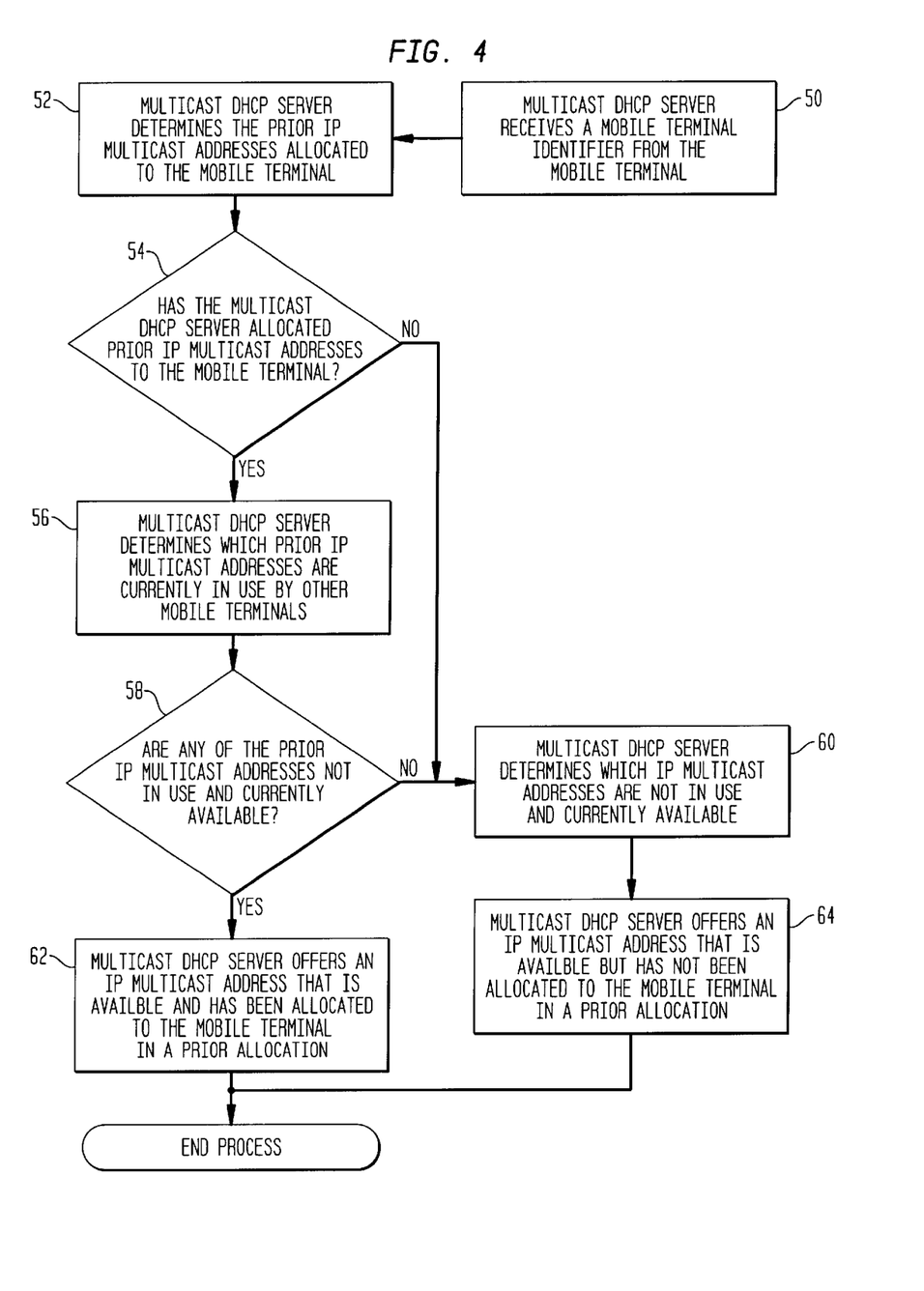
FIG. 4 is a flowchart of an IP multicast address offer process for our invention.

FIG. 4 shows the IP multicast address offer process, wherein the domain administrator determines which IP multicast address to offer to a mobile terminal when allocating an IP multicast address to the mobile terminal. When a mobile terminal requests an IP multicast address, the domain administrator attempts to offer an IP multicast address that has been allocated to the same mobile terminal in response to a prior IP multicast address request. Data caching at the mobile terminal depends on the IP multicast address allocated to the mobile terminal, and thus offering a prior IP multicast address to a mobile terminal decreases caching at the mobile terminal by allocating a prior IP multicast address that has been used to cache prior data. Within a wireless CDMA IP network, a multicast DHCP server performs the IP multicast address offer process as part of the IP multicast address allocation process.

Referring now to FIG. 4, the multicast DHCP server 14 first receives a unique mobile terminal identifier from the mobile terminal as part of the mobile terminal's IP multicast address request (step 50). The multicast DHCP server uses the mobile terminal identifier to determine which IP multicast addresses have been allocated to the mobile terminal in prior IP multicast address allocations by the multicast DHCP server (step 52).

The multicast DHCP server next determines if it has allocated prior IP multicast addresses to the mobile terminal in response to prior IP multicast address requests from the mobile terminal (step 54). If the multicast DHCP server has not allocated any prior IP multicast addresses to the mobile terminal in response to prior IP multicast address requests, then the process proceeds to step 60. Otherwise, the multicast DHCP server has allocated a prior IP multicast address to the mobile terminal in response to a prior IP multicast address request from the mobile terminal, and the process proceeds to step 56.

At step 56, the multicast DHCP server determines which of the prior IP multicast addresses allocated to the mobile terminal are currently in use by other mobile terminals. The multicast DHCP server then determines if any of the prior IP multicast addresses are currently available to offer to the mobile terminal because one or more of the prior IP multicast addresses are not in use by other mobile terminals (step 58). If none of the prior IP multicast addresses are currently available because they are all in use by other mobile terminals, then the process proceeds to step 60. If one or more of the prior IP multicast addresses are currently available for use by the mobile terminal, then the process proceeds to step 62.

If the multicast DHCP server has determined either that no prior IP multicast addresses have been allocated to the mobile terminal by the domain administrator, or that all prior allocated IP multicast addresses are currently in use and unavailable to offer to the mobile terminal, at step 60, then the multicast DHCP server determines which IP multicast addresses remain to offer the mobile terminal that have not been previously allocated to the same mobile terminal (step 60). The multicast DHCP server then selects and offers one of these non-prior IP multicast addresses to the mobile terminal (step 64). When selecting a non-prior IP multicast address to offer to the mobile terminal, the multicast DHCP server attempts to avoid those IP multicast addresses that have been allocated to other mobile terminals in prior IP multicast address allocations in the event that those other mobile terminals contact the multicast DHCP server and request an IP multicast address.

If the multicast DHCP server has determined that prior IP multicast addresses exist for the mobile terminal, and that one or more of these prior IP multicast addresses are currently available to offer to the mobile terminal, at step 58, then the multicast DHCP server selects one of these currently available prior IP multicast addresses to offer to the mobile terminal (step 62). When selecting which currently available prior IP multicast address to offer to the mobile terminal, the multicast DHCP server attempts to avoid those IP multicast addresses that have also been allocated to other mobile terminals in prior IP multicast address allocations in the event that those other mobile terminals contact the domain administrator and request an IP multicast address.

Figure 5:
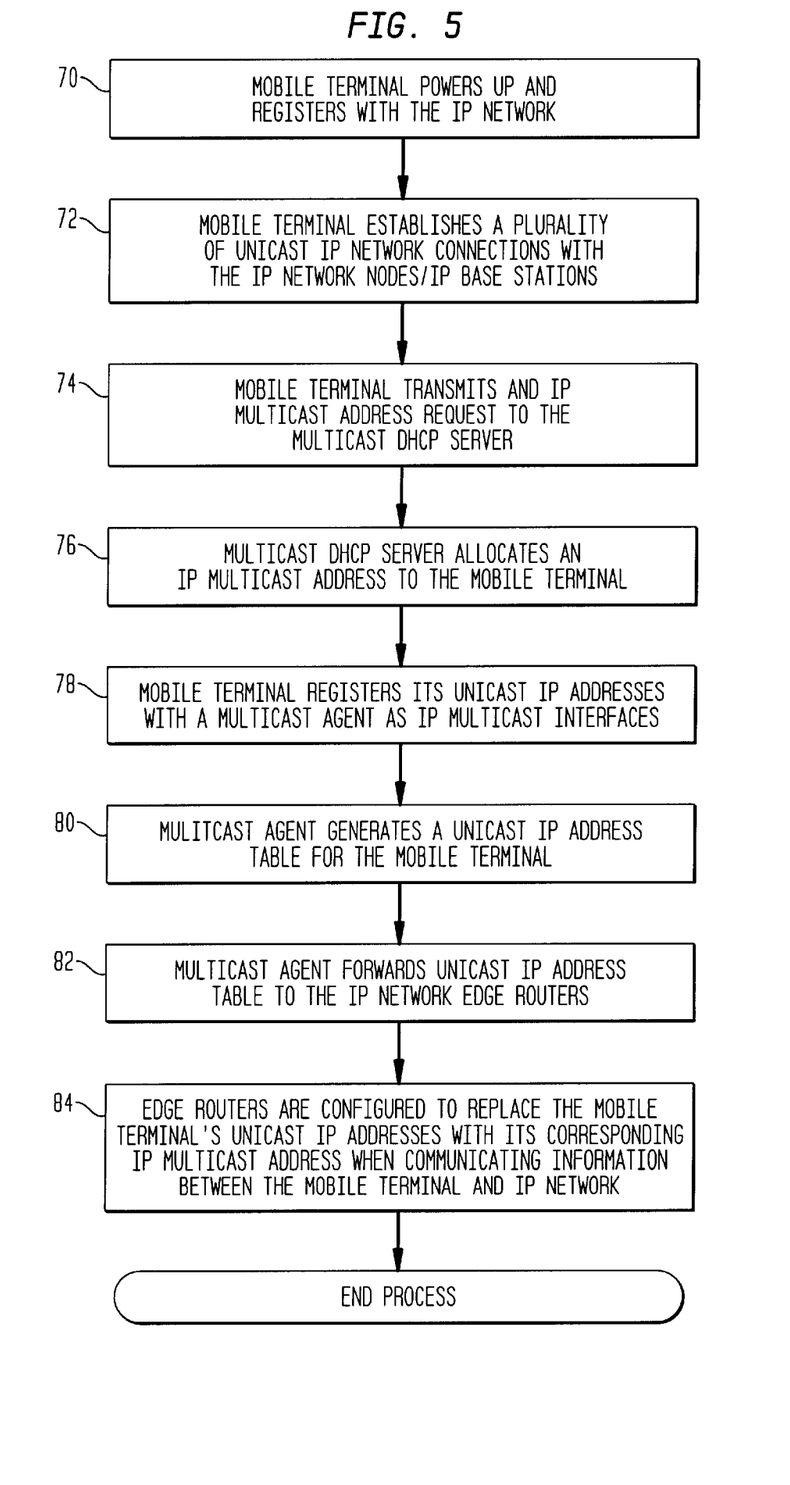
FIG. 5 is a flowchart of an IP multicasting soft handoff process in accordance with an embodiment of our invention.
Figure 6:
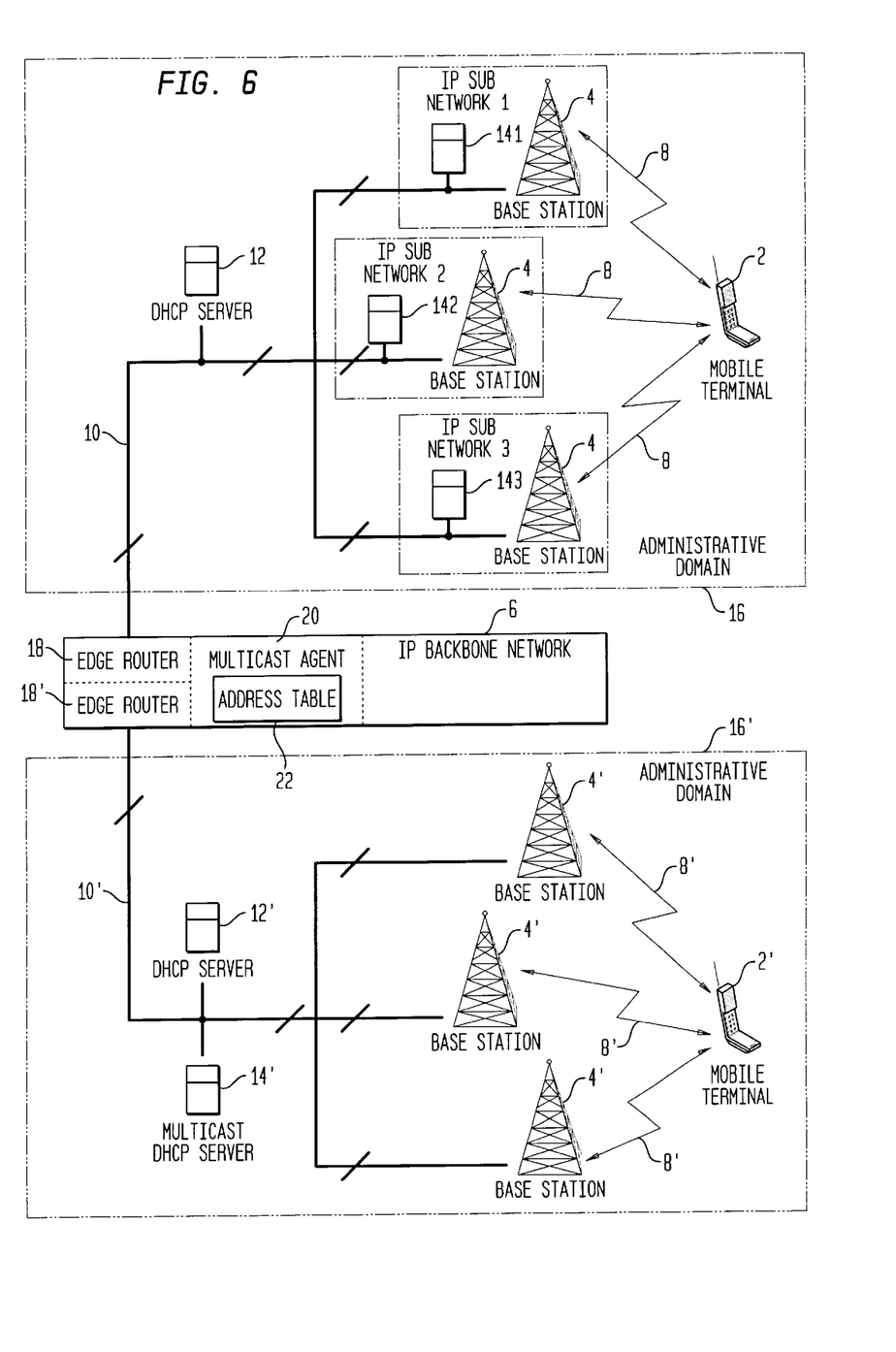
FIG. 6 is a block diagram of another illustrative embodiment of our invention.

FIG. 5 shows the IP multicasting soft handoff process wherein a mobile terminal establishes soft handoff with a plurality of IP network nodes. For "all IP" CDMA IP network architectures, each IP network node corresponds to an IP base station, and soft handoff establishes simultaneous communication between the mobile terminal and a plurality of IP base stations via multicast network connections between the mobile terminal and the plurality of IP base stations.

Referring now to FIG. 5, the mobile terminal first powers up and registers with the IP network (step 70). The mobile terminal then establishes a plurality of unicast IP network connections with the IP network nodes (step 72). For "all IP" wireless CDMA IP network architectures, each IP network node corresponds to an IP base station, and thus the mobile terminal establishes a plurality of unicast CDMA IP network connections with corresponding IP base stations. Each unicast CDMA IP network connection includes a unique IP address that is granted to the mobile terminal by each IP base station and used as an IP interface for multicasting between the mobile terminal and each IP base station.

Next, the mobile terminal transmits an IP multicast address request to a multicast DHCP server (step 74). The multicast DHCP server responds to the IP multicast address request by allocating an IP multicast address to the mobile terminal (step 76). The mobile terminal then registers its unicast IP addresses with a multicast agent by transmitting its unicast IP addresses, IP multicast address and mobile terminal identifier to the multicast agent (step 78). By registering its unicast IP addresses with a multicast agent, the mobile terminal's unicast IP network connections between itself and the plurality of IP network nodes/IP base stations become multicast network connections that communicate multicast messages between the mobile terminal and wireless IP network.

The multicast agent receives the mobile terminal's unicast IP addresses, IP multicast address and mobile terminal identifier, and generates a unicast IP address table for the mobile terminal (step 80). The unicast IP address table maps each of the mobile terminal's unicast IP addresses to the mobile terminal's IP multicast address and mobile terminal identifier, thereby enabling the wireless IP network to determine the corresponding IP multicast address for information communicated to a mobile terminal's unicast IP address. The multicast agent forwards the mobile terminal's unicast IP address table to the IP network edge routers (step 82), which are configured to replace the mobile terminal's unicast IP addresses with the mobile terminal's IP multicast address when communicating information between the mobile terminal and the wireless IP network (step 84). Thus, when an edge router receives information addressed to one of the mobile terminal's unicast IP addresses, the edge router replaces the unicast IP address with the mobile terminal's multicast IP address and broadcasts the information as a multicast message, thereby establishing soft handoff of the mobile terminal.

An IP network connection can be terminated and its IP multicast address released by the DHCP server timing out after a predetermined period of time. Alternatively, if a mobile terminal turns off, it can relinquish its IP multicast address to the DHCP server.

While the invention has been particularly shown and described with reference to preferred embodiments thereof, it will be understood by those skilled in the art that various changes in form and details may be made therein without departing from the spirit and scope of the invention.

What is claimed is:

1. A method for providing soft handoff of a mobile terminal between different administrative domains in a wireless internet protocol (IP) network, said network including an IP backbone network having a multicast agent and an edge router, each administrative domain including a plurality of base stations and a multicast DHCP server, and said mobile terminal having a unique identifier and a plurality of unicast addresses, said method comprising the steps of the mobile terminal upon leaving a first administrative domain and entering a second administrative domain establishing unicast network connections with the plurality of base stations in the second administrative domain, each connection corresponding to a unicast address, the mobile terminal transmitting with its unique identifier an IP multicast address request to the multicast DHCP server in the second administrative domain, and the multicast DHCP server in the second administrative domain determining the availability of a multicast address in the second administrative domain and assigning that multicast address to the mobile terminal, said multicast address being associated with the unicast addresses of the mobile terminal.

2. A method for providing soft handoff of a mobile terminal between different administrative domains in a wireless internet protocol (IP) network, said network including an IP backbone network having a multicast agent and an edge router, each administrative domain including a plurality of base stations and a multicast DHCP server, and said mobile terminal having a unique identifier and a plurality of unicast addresses, said method comprising the steps of the mobile terminal upon leaving a first administrative domain and entering a second administrative domain establishing unicast network connections with the plurality of base stations in the second administrative domain, each connection corresponding to a unicast address, the mobile terminal transmitting with its unique identifier an IP multicast address request to the multicast DHCP server in the second administrative domain, the multicast DHCP server in the second administrative domain determining the availability of a multicast address in the second administrative domain and assigning that multicast address to the mobile terminal, said multicast address being associated with the unicast addresses of the mobile terminal, generating in the multicast agent in the backbone network a unicast address table which associates the unique identifier for the mobile terminal with the assigned multicast address, the multicast agent forwarding the unique unicast address table to the edge router in the backbone network, and replacing in the edge router the mobile terminal unicast address with its corresponding multicast address from the address table.

3. The method in accordance with claim 2 further comprising the edge router communicating information from the backbone network to the mobile terminal as multicast broadcast messages.

4. A method for providing soft handoff of a mobile terminal between different administrative domains in a wireless internet protocol (IP) network, said network including an IP backbone network having a multicast agent and an edge router, each administrative domain including a plurality of base stations and a multicast DHCP server, and said mobile terminal having a unique identifier, said method comprising the steps of the mobile terminal upon leaving a first administrative domain and entering a second administrative domain establishing unicast network connections with the plurality of base stations in the second administrative domain, each connection corresponding to a unicast address, the mobile terminal transmitting with its unique identifier an IP multicast address request to the multicast DHCP server in the second administrative domain, the multicast server in the second administrative domain determining if a prior multicast address that had been assigned to the mobile terminal is available and, if so, assigning such prior multicast address to the mobile terminal, and generating in the multicast agent in the backbone network a unicast address table which associates the unique identifier for the mobile terminal with the assigned multicast address.

5. A method for providing soft handoff of a mobile terminal between different administrative domains in a wireless internet protocol (IP) network, said network including an IP backbone network having a multicast agent and an edge router, each administrative domain including a plurality of base stations and a multicast DHCP server, and said mobile terminal having a unique identifier, said method comprising the steps of the mobile terminal upon leaving a first administrative domain and entering a second administrative domain establishing unicast network connections with the plurality of base stations in the second administrative domain, each connection corresponding to a unicast address, the mobile terminal transmitting with its unique identifier an IP multicast address request to the multicast DHCP server in the second administrative domain, the multicast server in the second administrative domain determining if prior multicast addresses have been allocated to the mobile terminal, if a prior multicast address had been so allocated, determining if such prior multicast address is now available, if so available, assigning such prior multicast address to the mobile terminal, and generating in the multicast agent in the backbone network a unicast address table which associates the unique identifier for the mobile terminal with the assigned multicast address.

6. The method in accordance with claim 5 wherein the multicast DHCP server determines which IP multicast addresses are not in use and currently available in the second administrative domain if the DHCP server determines that there is no prior IP multicast address that had been allocated to the mobile terminal and which is currently available.

7. The method in accordance with claim 6 further comprising the steps of the multicast agent forwarding the unique unicast address table to the edge router in the backbone network, and replacing in the edge router the mobile terminal unicast address with its corresponding multicast address from the address table.

8. The method in accordance with claim 7 further comprising the edge router communicating information from the backbone network to the mobile terminal as multicast broadcast messages.

* * * * *

UNITED STATES PATENT AND TRADEMARK OFFICE
CERTIFICATE OF CORRECTION

| | | |
|---|---|---|
| PATENT NO. | : 6,611,510 B2 | Page 1 of 1 |
| APPLICATION NO. | : 09/883569 | |
| DATED | : August 26, 2003 | |
| INVENTOR(S) | : Famolari et al. | |

It is certified that error appears in the above-identified patent and that said Letters Patent is hereby corrected as shown below:

On the Title page, Item (54) and in the Specification, in Column 1, Line 3, under "Title", delete "NETWORKS." and insert -- NETWORKS --, therefor.

In the Specification

In Column 1, Line 6, delete "D. I Marples" and insert -- D. J Marples --, therefor.

In Column 1, Line 8, delete "Modem" and insert -- Modern --, therefor.

Signed and Sealed this
Sixteenth Day of December, 2014

Michelle K. Lee
*Deputy Director of the United States Patent and Trademark Office*